United States Patent [19]
Tremaglio et al.

[11] Patent Number: 5,526,725
[45] Date of Patent: Jun. 18, 1996

[54] RAPID INDEXING SPINDLE DRIVE ATTACHMENT FOR CAM CONTROLLED AUTOMATIC SCREW MACHINES

[76] Inventors: Neil L. Tremaglio, 505 Three Mile Hill Rd., Middlebury, Conn. 06762; Angelo F. Tremaglio, 101 Southgate Rd.; Caesar D. Tremaglio, 73 Camp Field Rd., both of Waterbury, Conn. 06708; Lawrence E. Rode, Ridge Rd., Terryville, Conn. 06786; Alfred R. Smith, 32 Godwin St., Bristol, Conn. 06010

[21] Appl. No.: 216,333

[22] Filed: Mar. 23, 1994

[51] Int. Cl.$^6$ .................... B23B 7/14; B23B 1/00; B23Q 33/00
[52] U.S. Cl. .................... 82/1.11; 82/11.3; 82/119; 82/152
[58] Field of Search .................... 82/11.3, 19, 118, 82/119, 152, 1.11; 29/27 R, 27 C; 470/66, 75; 318/571, 578; 364/474.02

[56] References Cited

U.S. PATENT DOCUMENTS

| | | | |
|---|---|---|---|
| 4,233,359 | 3/1981 | Youden | 82/118 |
| 4,656,897 | 4/1987 | von Niederhausern et al. | 82/118 |
| 4,992,711 | 2/1991 | Sugita et al. | 318/571 |

*Primary Examiner*—Maurina T. Rachuba
*Assistant Examiner*—Kenneth S. Hansen
*Attorney, Agent, or Firm*—Sherman and Shalloway

[57] ABSTRACT

The present invention provides a rapid indexing spindle drive and control apparatus for installation as a retrofit on a cam controlled automatic screw machine to provide the capabilities of variable spindle speed and direction as well as rapid indexing of the spindle in relation to the tool head of the screw machine for stationary tool operations. The apparatus includes a variable speed, low mass servo-motor mounted on the headstock of the machine and connected to the spindle by a 1:1 drive ratio timing belt and pulley system. A cam shaft revolution sensor is mounted adjacent to the screw machine cam shaft and is driven by the cam shaft through a second 1:1 drive ratio timing belt and pulley system. Electronically connected to the servo-motor and the cam shaft revolution sensor is a computer control system which includes a computer and an operator interface unit whereby cam shaft positions and spindle drive commands corresponding to specific cam shaft positions are entered by the machine operator. In operation, the computer receives signals constantly generated by the cam shaft revolution sensor and a resolver in the servo-motor which signals correspond to the rotational positions of the cam shaft and the servo-motor respectively. These signals are compared to the values entered from the operator interface unit and the appropriate spindle commands are issued by the computer at the same points for each revolution of the cam shaft.

19 Claims, 4 Drawing Sheets

RAPID INDEXING SPINDLE DRIVE ATTACHMENT FOR CAM CONTROLLED AUTOMATIC SCREW MACHINES

BACKGROUND OF THE INVENTION

Cam controlled automatic screw machines are metal working lathes whose automatic operation is obtained by a cam shaft which controls the succession of productive operations and idle periods and the movements of all working parts. The cams on the shaft may be changed or adjusted and, once set, such machines are automatic, producing a series of identical parts from a piece of bar stock.

Traditionally, these machines are limited to performing operations that require the work to be rotating, such rotation being applied by the headstock spindle within which the work is held. In order to perform operations in which the work is stationary, such as cross drilling or the like, it has been necessary to remove the part from the screw machine and take it to another machine for the stationary operation. Alternatively, the spindle rotation must be stopped and the screw machine provided with the necessary tools to perform the stationary operation. Stopping the spindle rotation is necessary to avoid breakage of cross milling tools and drills. Also, it is necessary in some cases to be able to properly position the operation performed by the stationary tool. Furthermore, in the case of fine tolerance parts, the rotary positioning of the work must be accomplished with accuracy so that the site of the stationary operation is precisely located. Applicants' prior U.S. Pat. No. 5,105,925 discloses such a braking attachment for automatic Swiss screw machines.

However, cam controlled automatic screw machines are further limited in that the headstock spindle rotates in only one direction and at one speed for any particular set-up. Since the spindle is normally driven from the main motor of the machine which also drives the cam shaft which controls the operating sequence of the tools, it is not possible to change either the rotational direction of the spindle or its speed during operation as this would also affect the cam shaft rotation and, thereby, the sequence of tool operations. Such capability on existing machines is desireable because of the cost of replacing them with newer models and the deficiencies of the newer machines themselves.

Although newer models of these machines have means for stopping the spindles and changing their direction or speed of rotation built in or available as an additional option, the mechanisms of these devices involve a complex assembly of clutches and bearings within the machines. Such assemblies require the services of an experienced mechanic to set and maintain them and are not adaptable to other types of machines or indeed to the large established base of older machines which are in current and daily use. In addition, because these newer machines still drive the spindle and the tool operations off of the main machine motor which, together with the driven portions of the machine, presents a large mass to stop and start, indexing and changes in the direction of rotation of the spindle on these machines is more difficult to achieve.

Recognizing the need for a simple apparatus, easily adaptable to existing cam controlled automatic screw machines which would add the desired capabilities thereto, the inventors herein have devised such an apparatus, comprising essentially four parts, that is simple to set-up and use yet provides positive and accurate control over the rotation of the screw machine spindle in concert with the tool head operation of the machine. In addition, the apparatus of this invention provides for more economical operation of machines on which it is installed in that it provides faster speeds of operation, including faster rates of indexing, speed and direction changes, in most cases allowing a greater number of parts to be produced in a given amount of time over other machines.

SUMMARY OF THE INVENTION

The apparatus comprises four basic parts. A low mass high speed servo-motor is installed on the sliding headstock to drive the spindle in place of the standard drive means from the main machine motor. The servo-motor is capable of variable speeds up to about 7500 rpm and includes a built-in positioning device, or resolver, whereby the rotational position of the motor axis is accurately identified at any time through its 360° rotation. The motor position is reported to a control computer which, in turn, controls the speed, direction and stopping points of the motor in response to particular programming commands which are input by the operator and which will differ with the particular part being made. The servo-motor drives the spindle through a 1:1 drive means so that the spindle rotation and position is identical to that of the servo-motor. In this manner the speed, direction and indexed position of the spindle are controlled according to the identical parameters set for the servo-motor.

The cam shaft is an existing part of automatic screw machines and is the main control mechanism for all the tool operations performed by the tool head. When the machine is running, the cam shaft is driven at a specific rate, usually one revolution for each part made, so that cams installed thereon rotate, their lobes engaging actuating means for different milling tools installed on the machine. The cams are arranged so that the tools are actuated at specific times to perform their particular operations on the rotating stock. These cams may be changed depending on the particular tool to be used or operation to be performed, thereby permitting the machine to be easily set up or changed to perform the operations necessary to make different items from the rotating stock held in the spindle.

Coordination of the servo-motor operation with the cam actuated tools through the control computer is achieved by an encoder position reading device which reads the exact rotational position of the cam shaft and supplies this information to the control computer. Like the servo-motor/spindle drive connection, the encoder is driven by the cam shaft through a 1:1 drive means so that the rotation of the encoder is identical to that of the cam shaft. Since the tool head operations and the lateral motion of the sliding headstock are controlled from the cam shaft, the control computer, through the rotational information supplied by the encoder, knows at what point the cam shaft is during its rotation and what operations are being performed. It can, therefor, initiate the sequences of its programming for the servo-motor to effect any programmed indexing, speed or directional changes of the spindle.

The control computer and the operator interface by which the computer and the spindle operations are programmed are separate from the screw machine, the computer and its associated items being housed in a cabinet which is sealed against dust, dirt, oil, etc. The servo-motor, resolver and encoder connect to the control computer by cables running from each component to the computer through sealed fittings in the cabinet. The operator interface is preferably mounted to the computer cabinet so as to be readily accessible by the machine operator and easily positionable relative to the machine. It is likewise sealed against dust, dirt, oil, etc. Preferably, the operator interface includes an operating function read out, control keys permitting direct programming of the computer, start and stop switches, emergency stop means, run condition indicators, and the like.

By using the already existing cam shaft of the screw machine in combination with the encoder to trigger the control computer, the inventors herein have overcome the need for a complicated gear and clutch mechanism such as has been employed on other machines to obtain the same result. Furthermore, use of the existing cam shaft and the computer controlled servo-motor enables the present apparatus to be easily retrofitted to existing machines enabling them to be easily set up to index the spindle or change its rotational speed or direction at any point in the sequence of operations to be performed. In addition to the servo-motor, the control computer may also be programmed to activate accessory tools used in conjunction with the screw machine tool head to perform operations on the part being produced. Such accessory tools include, but are not limited to, air operated items such as cross drills and milling cutters which are not a part of the cam controlled automatic screw machine.

Accordingly, it is an object of this invention to provide an add on apparatus and control means for cam controlled automatic screw machines to control spindle rotation.

It is a further object to provide such an apparatus and means which is simple to set up and use and which provides accurate control over the spindle rotation.

It is a still further object to provide such an apparatus and control means which may be easily and readily adapted to existing cam controlled automatic screw machines.

It is an even further object to provide an apparatus and control means whereby the control of the spindle rotation is coordinated with the existing cam shaft control of the tool operations of an automatic screw machine.

And it is a still further object to provide a method whereby an existing cam controlled automatic screw machine may be retrofitted to provide precise control of the spindle to include variable speed, changes in the direction of rotation and rapid indexing relative to the tool head of the machine.

Further objects and advantages will become evident from the following description and drawings which present the invention in connection with a Swiss type cam controlled automatic screw machine.

BRIEF DESCRIPTION OF THE DRAWING FIGURES

DETAILED DESCRIPTION OF THE INVENTION

The invention, though applicable to any type of cam controlled automatic screw machine or lathe, is particularly described herein as mounted on and operating a Swiss type automatic screw machine.

Figure 1:
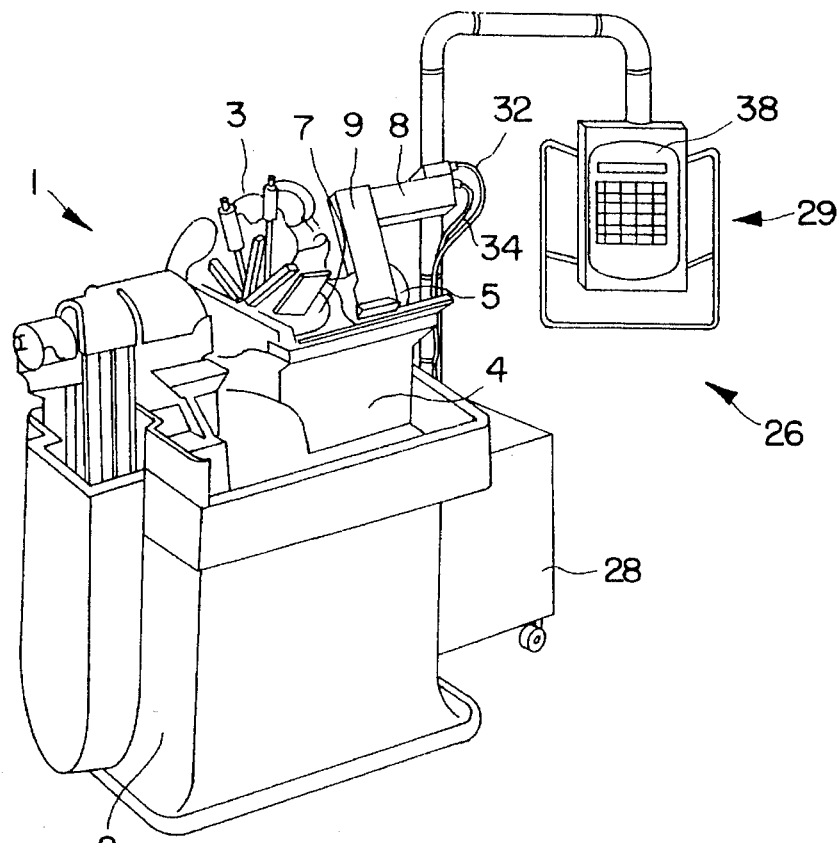
FIG. 1 is an oblique view of an automatic screw machine with the rapid index spindle drive system of the present invention installed.
Figure 2:
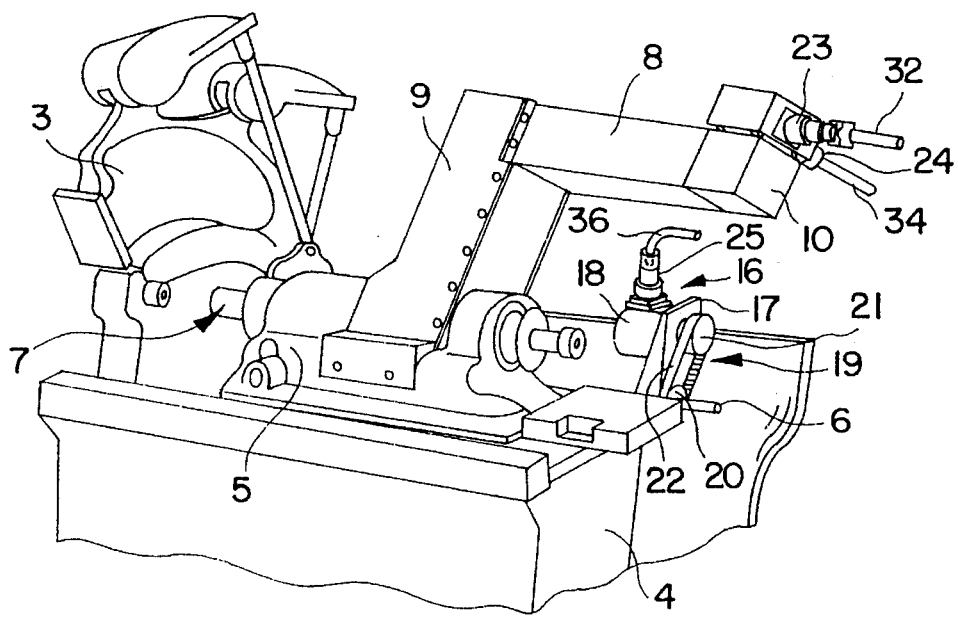
FIG. 2 is a detailed view of the headstock area of the machine of FIG. 1 showing the spindle drive and the cam shaft encoder.

FIG. 1 illustrates a cam controlled automatic screw machine 1 on which the apparatus of this invention is mounted. The screw machine 1 comprises a support base 2 which houses the main drive motor (not shown) of the machine 1 and which supports the tool head 3 and the main machine body casting 4 on which the sliding headstock 5 rides, the cam shaft 6 which is seen in FIG. 2 and additional drive and control mechanisms which, while common to automatic screw machines, do not form a part of the present invention. Mounted within the sliding headstock 5 is the work holding spindle 7. Normally the spindle 7 is drivingly connected to the main drive motor of the machine 1 whereby it is driven to rotate about its axis at a constant speed and in only one direction during operation of the machine 1.

Applicants' present invention is directed to a rapid indexing spindle drive and control apparatus which is adaptable to existing cam controlled automatic screw machines as a retrofitted assembly. The apparatus replaces the normal drive connection between the spindle 7 and the main drive motor of the machine 1 to provide variable speed, direction of rotation and indexing to the spindle 7. The rapid indexing spindle drive and control apparatus of this invention comprises four principal parts, two of which are mounted directly on the screw machine 1 and two of which are electronically connected to the first two parts.

Looking at FIGS. 1 and 2, the first part of the apparatus is a low mass, high speed servo-motor 8 mounted to the headstock 5 by a rigid mount 9 which is custom designed for each model of automatic screw machine 1. The mount 9 bolts securely to the headstock 5 to provide a secure brace for the servo-motor 8 and a shield for a driving connection with the spindle 7. The servo-motor 8 replaces the normal spindle drive connection with the main drive motor of the screw machine 1. Furthermore, the servo-motor 8 is capable of variable speeds of from 0 rpm up to about 7500 rpm and includes a built in position reading device or resolver 10 which constantly monitors the position of the servo-motor 8 through each 360° revolution. The resolver 10 may be mechanical, optical or electronic and generates a constant number of electronic pulses for each 360° revolution, which pulses are readable by a computer to determine the exact position of the servo-motor 8. Preferably the resolver 10 generates 4096 pulses for each 360° revolution of the servo-motor 8. In addition to variable speed and accurate positioning, the servo-motor 8 is also capable of reversing direction and doing so quickly since it is of low mass and is only driving the spindle. Furthermore, since the servo-motor 8 replaces the screw machine main motor as the drive means for the spindle 7, the capabilities of the servo-motor 8 are imparted directly to the spindle 7 such that the spindle 7 and any work piece held and rotated thereby become capable of the same variable speed, directional changes from clockwise to counter-clockwise rotation and vice-versa, and accurate positioning or indexing of the motor at specified points in the tooling operations.

Figure 3:
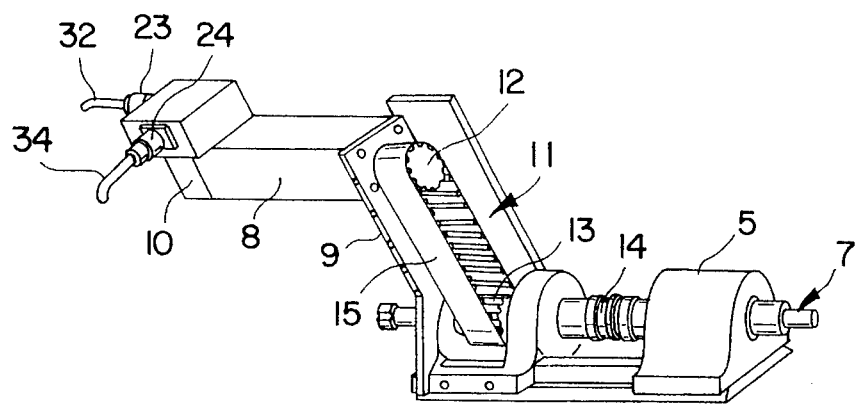
FIG. 3 is a detailed view of the headstock of FIG. 2 showing the servo-motor/spindle drive connection.

The capabilities of the servo-motor 8 are imparted to the spindle 7 by a 1:1 drive means 11 housed in the mount/drive shield 9, as shown in FIG. 3. In this view one face of the servo-motor mount and drive shield 9 has been removed to expose the drive means 11 which comprises a pulley 12 mounted to the servo-motor 8, an identical pulley 13 mounted on the shaft 14 of the spindle 7 and a drive belt 15 wound around and engaging both pulleys 12 and 13. The drive belt 15 is an endless timing belt and is preferably a toothed belt as shown. The pulleys 12 and 13 are correspondingly toothed to positively engage the belt 15. Alternatively, the pulleys 12 and 13 and the belt 15 may be replaced with identical sprocket wheels and a timing chain. However, the pulley and belt combination depicted in FIG. 3 is preferred.

By using the 1:1 drive means 11 to drive the spindle 7, one revolution of the servo-motor 8 in a clockwise direction at any speed equals one revolution of the spindle 7 in that direction at the same speed. Likewise, one revolution of the servo-motor 8 in the counter-clockwise direction at any speed equals one revolution of the spindle 7 in the same direction at that speed. Similarly, the pulses generated by the resolver 10 which indicate the position of the servo-motor 8 through one 360° revolution also indicate the identical position of the spindle 7 through one revolution. Thus, any action taken by the servo-motor 8 will be taken by the spindle 7 in an identical manner.

Figure 4:
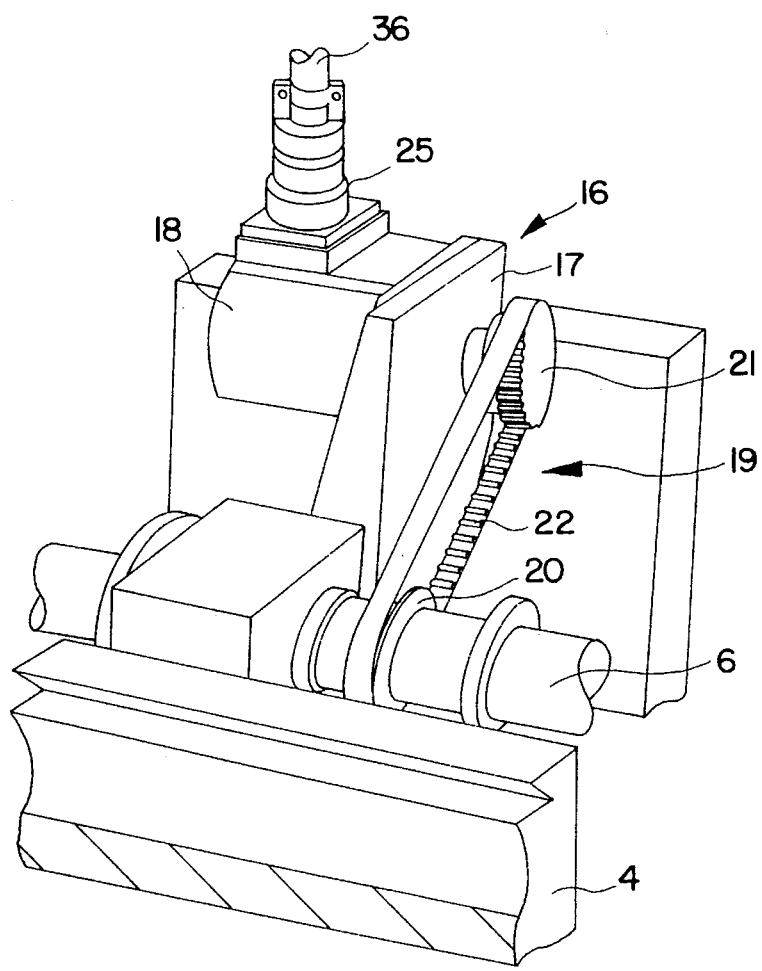
FIG. 4 is a detailed view of the cam shaft/encoder of FIG. 2.

Returning to FIG. 2, the second part of the apparatus is the cam shaft revolution sensor 16. FIG. 4 provides a detailed view of this part. The cam shaft revolution sensor 16 preferably comprises a rigid mounting bracket 17 which secures the sensor 16 to the main machine body casting 4, an encoder unit 18 and a drive means 19 between the cam shaft 6 and the encoder unit 18. Unlike the servo-motor 8 which drives the spindle 7, the encoder unit 18 is driven by the cam shaft 6 which, itself, remains driven by the main drive motor of the screw machine 1. However, like the servo-motor/spindle drive means 11, the drive means 19 between the cam shaft 6 and the encoder unit 18 is also a 1:1 drive ratio and preferably comprises identical pulleys 20 and 21, mounted respectively on the cam shaft 6 and the encoder unit 18, and connected by a toothed timing belt 22. As with the servo-motor/spindle drive means 11, an alternative cam shaft/encoder unit drive means 19 may be obtained with identical sprocket wheels in place of the pulleys 20 and 21 and a timing chain in place of the belt 22.

Like the resolver 10 of servo-motor 8, the encoder unit 18 of the cam shaft revolution sensor 16 is a position reading device which may operate mechanically, optically or electronically and which generates a constant number of electronic pulses for each 360° revolution of the encoder unit 18. These pulses are indicative of the encoder unit's position through each 360° revolution and are readable by a computer. Furthermore, since the encoder unit 18 is driven by the cam shaft 6 through the 1:1 drive means 19, the rotational position of the encoder unit 18 at any point through one 360° revolution is identical to the rotational position of the cam shaft 6. Thus, the pulses generated by the encoder unit 18 are directly indicative of the rotational position of the cam shaft 6.

As noted above, the encoder unit 18 generates a constant number of pulses for each 360° revolution of the cam shaft 6. Preferably, the number of pulses generated is 1024. Furthermore, since the cam shaft 6 controls the operation of the tool head 3 of the machine 1 such that one item is made by the machine 1 for each revolution of the cam shaft 6, the pulses generated by the encoder unit 18 are also directly indicative of the tool operation being performed at any one moment.

Figure 5:
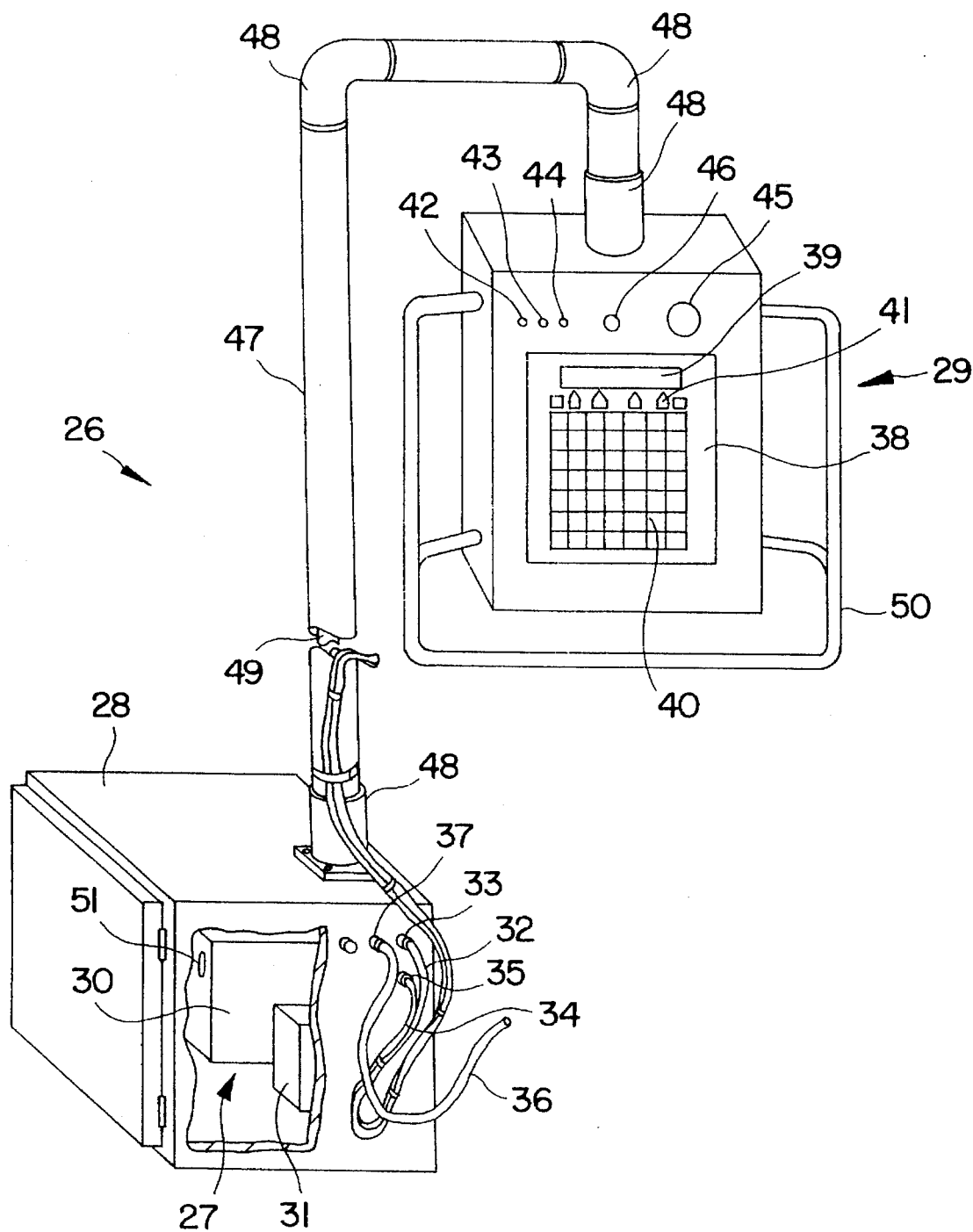
FIG. 5 is a view of the control computer and operator interface combination of the rapid index spindle drive system of this invention.

The servo-motor 8, resolver 10 and encoder unit 18 are provided with connectors 23, 24 and 25 respectively, for electronic cables whereby the servo-motor 8, resolver 10 and encoder unit 18 are connected to a main control unit 26 separately positioned adjacent to the machine 1 and shown in FIG. 5. The main control unit 26 comprises the two parts separate from the machine 1 which provide electrical and electronic control of the drive apparatus of the invention. The two parts of the control unit 26 comprise a control computer assembly 27 housed in a cabinet 28 and an operator interface unit 29 which is preferably mounted to the cabinet 28 in a manner so as to be readily accessible by the operator and easily positionable relative to the machine 1 without moving the cabinet 28.

Control computer assembly 27 comprises a main programmable computer 30 and a power supply 31 for the servo-motor 8. The cabinet 28 is preferably sealed against dust, dirt, grease, oil and water or the like to protect the electronics therein. The servo-motor 8 is electrically connected to the power supply 31 by an electrical cable 32 running from the connector 23 into the cabinet 28 through a sealed feedthrough 33. Electrical power is provided to the servo-motor 8 by the power supply 31 through the cable 32 in response to commands from the computer 30. Similarly, the resolver 10 is electronically connected to the computer 30 by an electrical cable 34 running from the connector 24 through a second sealed feedthrough 35. By this connection, resolver pulses are transmitted to the computer 30 which uses those pulses to determine the exact position of the servo-motor 8 and the spindle 7. This information is compared with the computer's programming and information received from the encoder unit 18 to produce commands to control the operation of the servo-motor 8. In order to transmit the pulses from the encoder unit 18 to the computer 30, a third electrical cable connects the encoder unit 18 to the computer 30 by connection to connector 25 and passes through a third sealed feedthrough 37 into the cabinet 28. The computer 30 uses these pulses to determine the position of the cam shaft 6 and, thereby, the particular tool operation being performed by the tool head 3. This information triggers the computer 30 to issue commands to the servo-motor 8 directing its speed, direction changes and indexed stops at the same points during each rotation of the cam shaft 6.

Operator interface unit 29 provides a means whereby the machine operator may program the computer 30 and directly control the operation of the machine 1. The operator interface unit 29 comprises a control panel 38 having a changable display means 39 and a plurality of control switches 40. At least one row of soft control switches 41 is immediately adjacent to the changable display means 39 and have variable functions which are determined by the operating program of the apparatus. The function of each soft switch 41 is identified by information displayed on the changable display means 39. Additionally, a series of panel lights comprise a green ready light 42, a yellow running light 43 and a red emergency stop light 44. Also provided on the operator interface unit 29 are an emergency stop button 45 and a reset button 46 whereby the operation of the apparatus and the machine 1 may be quickly stopped and the program reset following such a stop.

As shown in FIGS. 1 and 5, the operator interface control unit 29 is mounted to the cabinet 28 by a pylon arm 47 which has a plurality of swivel connections 48 between the pylon arm 47 and the operator interface unit 29, between the pylon arm 47 and the cabinet 28 and between the individual sections of the pylon arm 47. These swivel connections 48 permit a wide variety in adjustable positioning of the operator interface unit 29 relative to the operator, the cabinet 28 and the machine 1. The pylon arm 47 and the various swivel connections 48 are preferably hollow thereby providing a conduit through which electronic cables 49 may pass to connect the operator interface unit 29 to the computer 30. Manipulating handles 50 are also provided on the interface unit 29 for ease in positioning the unit 29.

It is noted that this embodiment of the mounting for the operator interface unit 29, although preferred, is only one of many mounting means which may be used. The principal criteria are that the interface unit 29 be electronically connected to the computer 30 and that it be relatively positionable to the machine 1 and to the operator so as to be readily accessible during operation of the machine 1. Furthermore, the control switches 40 on the panel 38 may be any number or have any function consistent with the programming and control requirements of the computer 30 and the software used and any variations in the functions of the switches 40 and the mounting means are considered to be within the scope of this disclosure and invention.

In operation, the control computer 30 is programmed with the steps required for the machine 1 to produce the desired part. This programming includes instructions which determine when, in the course of each revolution of the cam shaft 6, the servo-motor 8 must be started, stopped, speeded up, slowed down or its direction reversed. Such programming is preferably entered directly from the operator interface control unit 29 in conjunction with the set-up of the cams and tool head 3 of the machine 1 but may also be directly downloaded to the computer 30 from a stored program in a remote device, an optional input/output connection 51 being included on the computer 30 for this purpose. Additionally, the computer 30 may include a built-in storage device in which programming for machining different parts may be stored once it is entered. In this manner, the machine need only be set-up to correspond with the cam and tool requirements for manufacturing the particular part and the particular operating program steps previously stored recalled from the storage device by the operator interface.

Following machine 1 set-up and programming of the computer 30, the machine 1 is started and the spindle drive is initiated. As the cam shaft 6 revolves, the encoder unit 18 is driven by the cam shaft 6 through the 1:1 drive means 19. The resulting pulses generated by the encoder unit 18 indicate the position of the cam shaft through each 360° revolution and are transmitted to the computer 30 along the cable 36. When the computer 30 is programmed to change the spindle 7 speed or direction during part manufacture, it is the encoder unit's 18 position, as signaled by the pulses, that triggers each step at the same point during every revolution of the cam shaft 6. In this manner, each change in the servo-motor 8 is coordinated with the cam shaft 6 and, thereby, with the operations of the tool head. The position of the servo-motor 8 and, through the 1:1 drive means 11, the position of the spindle 7 is constantly reported to the computer 30 by the pulses generated by the resolver 10. The computer 30 compares this information with the programming entered through the operator interface control panel 39 and the position of the cam shaft 6 as reported by the encoder unit 18. In this manner, the computer 30 knows the position of the spindle 7 at any time during the operation of the machine 1 and, in response to the encoder unit 18 signals and the programming can direct the motor where and when to stop for a particular tooling operation.

Thus, the servo-motor 8 can be directed to stop at specific points within its 360° rotation which will coordinate with the position at which a cross milling operation is desired on the work piece. Because the servo-motor 8 drives the spindle through the 1:1 drive means 11, the spindle will be indexed relative to the tool head 3 at the same angular position as the servo-motor 8. Furthermore, since the servo-motor 8 is a low mass device and only drives the spindle 7, the overall mass to be stopped and started is significantly lower than on newer machines where these capabilities are built in and driven off the main machine motor thereby providing for more rapid starting and stopping and more rapid and accurate indexing. In addition, if any accessory tool items are installed on the machine 1, such as an air powered cross drill or the like, the operation of such devices may also, preferably, be controlled by the computer 30 and will therefor be triggered by the pulses from the encoder unit 18 and coordinated with the operation of the servo-motor 8. Alternatively, the operation of such accessories may be controlled by cams on the cam shaft 6.

Direct programming of the computer 30 is coordinated with the mechanical set-up of the cam shaft 6 and the tool head to produce a particular part and is accomplished through the operator interface unit 29 control panel 38. Through the control switches 40 and the soft switches 41, the initial system parameters are entered. These system parameters may identify the particular type of cam controlled automatic screw machine on which the apparatus is installed and any accessories also present. In addition they may set the initial starting positions of the cam shaft 6 and the servo-motor 8 to zero. Following this, the settings for cam positions, tool operations, spindle velocity and direction change, if any, in addition to desired velocity changes are entered. Also, if the spindle is to be stopped and indexed at any particular point for a stationary operation, such as cross drilling, this too is entered. Since the servo-motor 8 and spindle 7 operations depend on the position of the cam shaft 6 at any point in the production of the part, all the settings for the spindle and accessory tool operations include a setting for the cam shaft 6 position at the point at which those operations are to occur. The cam shaft 6 positions are reported to the computer 30 by the encoder unit 18 at which point the computer compares the reported position with the values as entered from the operator interface control panel 39 and issues the appropriate command to the servo-motor which corresponds to that position. For example, if it is desired to index the spindle at 90° when the cam shaft reaches 180° so that a cross drilling operation may be performed, the command will be entered through the operator interface control panel 39 directing the computer 30 to stop the servo-motor rotation and index the servo-motor 8 at 90° when it senses the signal pulse from the encoder unit 18 which corresponds to the cam shaft 6 being at 180°. Even though the servo-motor 8, and thereby the spindle 7, is stationary, the cam shaft 6, since it is driven by the main drive motor of the machine 1, continues to rotate and when it reaches the desired point at which the cross drilling is finished and the computer has been instructed to resume servo-motor 8 operations, the position of the cam shaft 6 as reported by the encoder unit 18 will trigger the computer to execute that programmed step. Similarly, if the particular machining operations to be performed require a speed change or reversal of direction on the part of the servo-motor 8, these steps and the desired servo-motor speed and direction will also be programmed into the computer 30 through the operator interface control panel 39 with the corresponding cam shaft 6 positions at which such changes are to occur. Since the cam shaft position pulses are constantly generated and transmitted to the computer 30 by the encoder unit 18, the computer 30 is constantly comparing the position of the cam shaft 6 with its programmed instructions and when it reads a position for which it has a command for the servo-motor 8 it will transmit that command. If it is necessary to change any settings, this is accomplished by requesting an edit sub-routine whereby steps already programmed may be deleted or changed.

Figure 6:
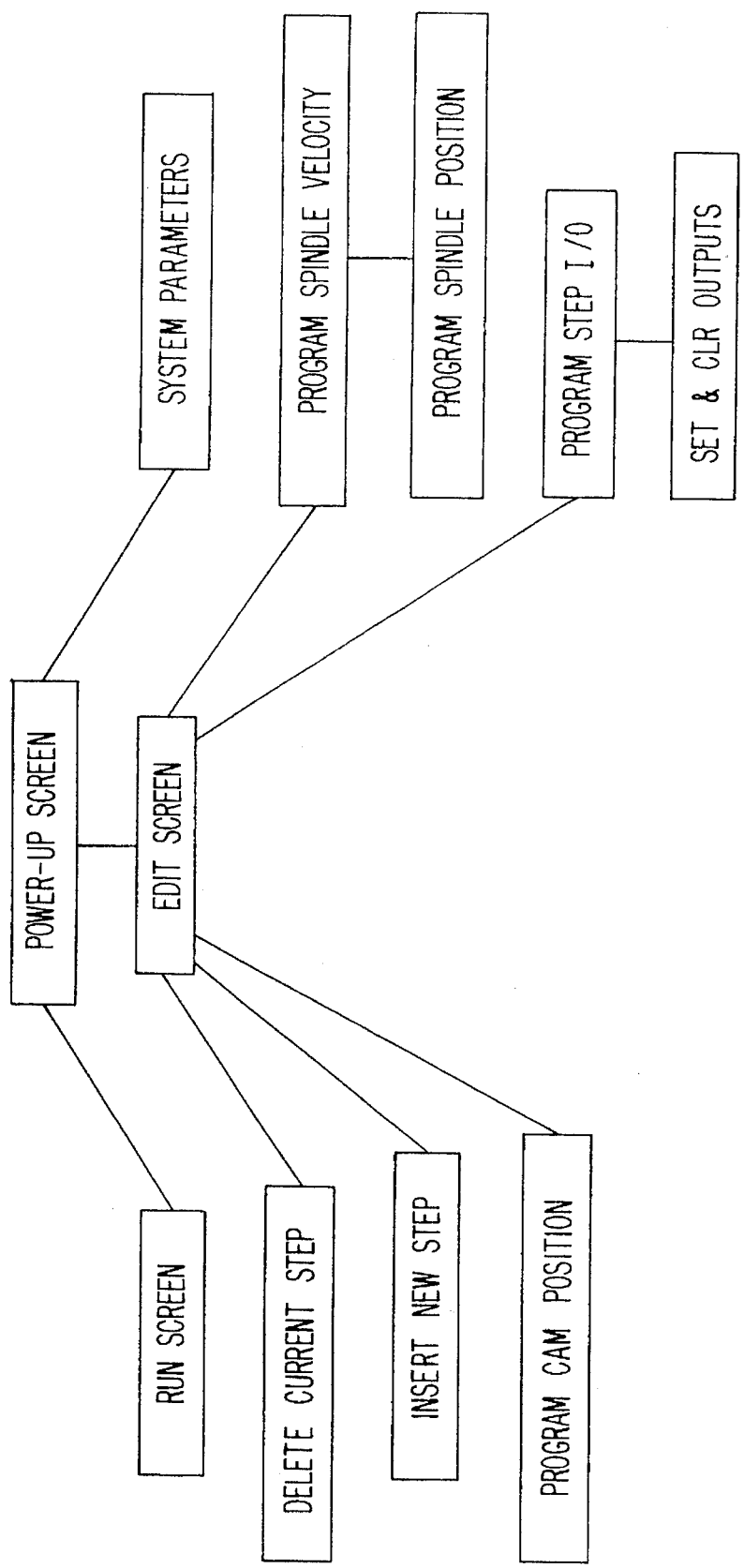
FIG. 6 is a flow chart of the programming screens and operational steps of the apparatus of this invention.

The display means 39 on the operator interface control panel 38 provides a visual display of the steps being programmed as they are entered. In addition, it indicates the particular function of the soft control switches 41 as the operator changes input screens. FIG. 6 illustrates the screen sequence used in programming the operation of the computer 30 through the operator interface control panel. The input screens are preferably a power-up screen, a run screen, a system parameters screen, an edit screen, a cam position setting screen, a spindle velocity screen, a spindle position setting screen, step insertion and deletion screens and I/O edit, set and clear screens. The power-up screen is displayed when the system is turned on and shows the current spindle axis position, cam axis position, program number and system status. It also provides operator access to the run screen, system parameters screen and the edit screen. The run screen is displayed when the system and the machine 1 are in operation and shows the current step, cam position, program and spindle speed or position while the system parameters screen displays the system parameters as set for the particular machine 1 and provides access to the control switches 40 to change any parameters.

The edit screen shows the cam position, spindle speed or position and I/O program status and provides access to the cam setting, spindle velocity and position setting, step insertion and deletion screens and the I/O control screens through the soft control switches 41 whose functions are changed with each individual screen. From the edit screen, the cam setting screen is accessed whereby new cam positions may be entered. Accessing the spindle velocity or position screens from the edit screen permits entry or change of the desired speed or position of the spindle in relation to the particular cam position for that step. For this purpose the control switches 40 are preferably provided with both numerical entry switches and direct servo-motor 8 actuation switches whereby the physical position of the servo-motor 8 and, thereby the spindle 7, may be entered numerically or directly changed by "jogging" the servo-motor forward or backward, the position thereof being reported to the computer 30 and operator interface unit 29 by the resolver 10. The step deletion and insertion screens provide access to functions whereby a particular step already entered may be deleted or a new step inserted. Finally, the I/O screens provide for editing, saving or clearing the individual steps entered in to the program.

As noted, the particular function of the soft control switches 41 changes for each screen and is displayed by the display means 39 in addition to the entered settings. For example, the soft switches 41 may be used in the spindle velocity and position screens to set the cam position, the spindle position and the spindle velocity and to program the I/O screen for the particular step. Alternatively, in the power-up screen, the soft switches 41 may be used to set the current spindle and current cam positions to zero to prepare to either run a program or enter a new program, and to either call up an existing program or to start a new program. The display means 39 is preferably an LCD screen of at least two lines; however, other changeable display means which are capable of displaying alphanumeric characters sufficient to provide the necessary information for this apparatus may also be used. With the exception of the run screen and the system parameters screen, all the programming screens are accessed through the edit screen which is itself accessed through the initial power-up screen.

Applicants herein have found that their apparatus, when installed on a cam controlled automatic screw machine, allows parts to be machined in a time period of from about one third to one half as long as it takes with the newer machines. In addition, because of the capability of variable spindle speed and higher speed provided by the servo-motor 8, parts with higher tolerances may be machined on existing cam controlled automatic screw machines on which the apparatus of this invention is installed. For example, fine threading, which must be cut at relatively high rpm, not previously attainable on standard cam controlled automatic screw machines, previously had to be performed on a separate machine. Using the apparatus of the present invention, such operations may now be performed on the cam controlled automatic screw machine at the time the parts are initially machined. Likewise, since cam controlled standard automatic screw machines generally only drive the spindle in a clockwise direction, operations such as reverse threading also had to be performed as a separate step on another machine. With the reversability of the spindle 7 driven by the present apparatus, this too may now be performed on the same machine and at the same time the parts are initially machined. Furthermore, since the control of the spindle drive means is directly related to the position of the cam shaft 6 and employs electronic means to trigger the operation of the servo-motor 8, the apparatus of this invention is readily adaptable to existing cam controlled automatic screw machines without the requirement of complex gearing, clutches and other mechanical control apparatus. And, by employing a computer control means which is directly programmable by the machine operator and which provides for storage of entered programs, reconfiguration of the automatic screw machines on which this apparatus is installed is quicker since the drive operation steps need simply be recalled from the storage means by the operator after making the necessary changes to the cam settings and the tool head. Accordingly, the advantages afforded by this invention are significant to those employing cam controlled automatic screw machines and are not otherwise available for application to existing machines of this type.

The preceding description has presented the preferred embodiments of the present invention, other embodiments and arrangements which may become evident to those of ordinary skill in the art from the teachings herein are considered to be within the scope of this invention and the appended claims.

What is claimed is:

1. A method for providing precise control of a work holding spindle of a cam controlled automatic screw machine wherein said machine includes a tool head, a revolvable cam shaft for controlling the operation of said tool head, a sliding headstock, a work holding spindle revolvable within said headstock, and a drive means driving said cam shaft and spindle, the method comprising the steps of, a) disconnecting said screw machine drive means from said spindle, providing a rapid index spindle drive attachment and control apparatus comprising a variable speed, reversible, low mass servo-motor having a resolver unit, mounting said servo-motor to said headstock and drivingly connecting said servo-motor to said spindle by a timing belt at a 1:1 drive ratio whereby the resolver unit is capable of reading the position of revolution of the servo-motor through 360° and whereby, through the 1:1 drive ratio, the spindle position is equal to the resolved position of the servo-motor, b) providing a cam shaft revolution sensor mounted adjacent to said cam shaft and drivably connecting said cam shaft revolution sensor to said cam shaft by a timing belt at a 1:1 drive ratio whereby the position of said sensor through 360° is equal to the position of the cam shaft, c) driving said spindle with said servo-motor and driving said cam shaft revolution sensor with said cam shaft, d) generating electronic signals from said resolver unit and said cam shaft revolution sensor whereby said signals correspond to the relative positions of said spindle and said cam shaft through 360°, e) providing a programmable control computer electronically connected to said servo-motor and to said cam shaft revolution sensor and capable of receiving said electronic signals, f) providing an operator interface unit electronically connected to said control computer whereby said control computer is programmed to respond to said signals from said resolver unit and said cam shaft revolution sensor and to issue control commands to said servo-motor, g) programming said control computer from said operator interface unit whereby commands are entered into said control computer corresponding to selected cam shaft positions and spindle operations to be performed when said cam shaft reaches said selected positions, wherein said signals are transmitted from said resolver and said cam shaft revolution sensor to said control computer and are compared to said cam shaft positions and said spindle operations entered into said control computer and wherein said control computer transmits commands corresponding to said programmed spindle operations to said servo-motor whereby said servo-motor is directed to start, stop, speed up, slow down or change direction of revolution in a manner which is coordinated with cam controlled operation of said tool heads and whereby said servo-motor, said resolver, said cam shaft revolution sensor, said programmable control computer and said operator interface unit are provided in combination and are adapted for retrofitting to an existing cam controlled automatic screw machine.

2. The method of claim 1 further comprising providing a rigid servo-motor mount and drive shield secured to said headstock whereby said servo-motor is mounted to said headstock.

3. The method of claim 2 further comprising providing a rigid mounting bracket whereby said cam shaft revolution sensor is rigidly mounted to said machine adjacent to said cam shaft.

4. An add-on rapid index spindle drive attachment and control apparatus for a cam controlled automatic screw machine wherein said machine includes a tool head, a revolvable cam shaft controlling the operation of said tool head, a sliding headstock, a work holding spindle revolvable within said headstock, and a drive means driving said cam shaft and said spindle, said rapid index spindle drive attachment and control apparatus providing a replacement drive means for said spindle independent of said screw machine drive means driving said cam shaft comprising;

an electronically controlled servo-motor capable of variable speed and direction and high rpm and having low mass mountable on said headstock and drivingly connectable to said spindle in place of said automatic screw machine drive means, a cam shaft revolution sensor mountable adjacent to said cam shaft and being drivable by said cam shaft, a programmable control computer electronically connectable to said servo-motor and said cam shaft revolution sensor and capable of receiving electronic signals from said servo-motor and said cam shaft revolution sensor and comparing said signals with programming entered into said computer, generating control commands for said servo-motor in response to said signals and said programming and issuing said control commands to said servo-motor at times corresponding to particular revolution positions of said cam shaft, and an operator interface control panel electronically connectable to said control computer and having input means whereby said programming corresponding to particular operations to be performed by the automatic screw machine and the spindle drive and control means in response to said positions of said cam shaft is entered into said control computer;

whereby, said servo-motor, said cam shaft revolution sensor, said control computer and said operator interface control panel are combinable with and modify said automatic screw machine whereby precision control of speed of revolution, direction of revolution, starting, stopping and indexing of said spindle corresponding to particular positions of said cam shaft is achieved and coordinated with operations of said tool head.

5. The apparatus of claim 4 wherein said servo-motor is capable of variable speed of from 0 to 7500 rpm and revolution in a clockwise and counter-clockwise direction and wherein said servo-motor is drivingly connectable to said spindle at a 1:1 ratio whereby one revolution of said servo-motor produces one revolution of said spindle.

6. The apparatus of claim 5 wherein said servo-motor includes an electronic position reading means whereby the revolving position of said motor is constantly detectable through 360° and whereby electronic signals corresponding to said revolving position of said servo-motor are constantly generated and transmitted to said control computer.

7. The apparatus of claim 6 wherein said cam shaft revolution sensor comprises an electronic position reading means and is drivable by said cam shaft at a 1:1 ratio independently of said servo-motor and spindle whereby one revolution of said cam shaft produces one revolution of said cam shaft revolution sensor and wherein said position reading means constantly generates electronic signals corresponding to the revolving position of said cam shaft revolution sensor through 360° and transmits said signals to said control computer.

8. The apparatus of claim 7 wherein said servo-motor position reading means generates 4096 pulses for each 360° revolution of said servo-motor and wherein said position reading means of said cam shaft revolution sensor generates 1024 pulses for each 360° revolution of said cam shaft.

9. The apparatus of claim 8 wherein said control computer is housed in a cabinet sealed against dust, dirt, oil and water and wherein said operator interface panel is adjustably mounted on said cabinet.

10. The apparatus of claim 9 wherein said input means of said operator interface control panel comprises a sealed membrane covered control panel having a plurality of programmable control switches and a display panel wherein said control switches and said display panel cooperate to provide a means for programming said control computer and wherein said operator interface control panel includes means to indicate the run condition of said spindle drive and control apparatus and emergency control means for deactivating said spindle drive apparatus.

11. In a cam controlled automatic screw machine comprising a sliding headstock, a work holding spindle means revolving within said headstock, a tool head, a revolving cam shaft having cams thereon whereby operation of said tool head is controlled, and a drive motor driving said spindle means, cam shaft and head stock, the improvement comprising an add-on rapid index spindle drive attachment and control apparatus mountable on said cam controlled automatic screw machine and modifying said machine to provide precision control of the speed and direction of rotation of said spindle, said spindle drive and control apparatus comprising;

a low mass servo-motor drivingly connectable to said spindle at a 1:1 drive ratio by a drive means, a rigid mount holding said servo-motor and housing said drive means and securely mountable to said head stock, a cam shaft revolution sensor mountable adjacent to said cam shaft and drivably connectable to said cam shaft at a 1:1 drive ratio, a control means responsive to said cam shaft revolution sensor, and an operator interface means whereby said control means is preset, whereby said servo-motor is connectable to said spindle in place of said drive motor to drive said spindle independently of said cam shaft and whereby said servo-motor is capable of variable speed, reversible direction and precision indexing under control of said control means in response to parameters input from said operator interface means and signals received from said cam shaft revolution sensor and processed by said control means, whereby said changes in speed and direction and said precision indexing are directly transmitted to said Spindle by said drive means independent of but in controlled relation to said cam rotation and tool head operation.

12. The apparatus of claim 11 wherein said drive means comprises identical pulleys mounted on said servo-motor and said spindle and an endless timing belt wound about and engaging said pulleys whereby said servo-motor drives said spindle at a rate and in a direction identical to that of said servo-motor and whereby said spindle is directly indexable at positions through 360° corresponding to indexing of said servo-motor.

13. The apparatus of claim 12 wherein said servo-motor includes a resolver unit electronically connected to said control means whereby electronic signals corresponding to the position of revolution of said servo-motor through 360° are constantly generated and transmitted to said control means.

14. The apparatus of claim 13 wherein said cam shaft revolution sensor comprises an electronic encoder unit driven by said cam shaft independently of said spindle and servo-motor and electronically connected to said control means said sensor constantly generates electronic signals corresponding to the position of revolution of said cam shaft and said encoder unit and transmits said signals to said control means.

15. The apparatus of claim 14 wherein said servo-motor is electrically connected to said control means whereby operation of said servo-motor and said spindle is controlled by said control means in response to said signals transmitted from said resolver and said encoder unit.

16. The apparatus of claim 15 wherein said control means comprises a computer which is electronically programmable through said operator interface means to respond to said signals from said encoder unit and said resolver unit whereby said computer generates a response which is transmitted to said servo-motor in the form of electronic control signals directing the starting, stopping, speed and direction of revolution of said servo-motor.

17. The apparatus of claim 16 wherein said computer control means is electronically programmable through said operator interface means whereby information corresponding to cam shaft position, spindle velocity, spindle direction and spindle indexing position are entered into said computer control means wherein said operator interface control means comprises control switches, changeable function control switches and a display means, whereby said information is entered using said control switches and said changeable function control switches and said information is viewed on said display means.

18. The apparatus of claim 17 wherein said computer control means receives said information entered through said operator interface control means and compares said information with said signals received from said encoder unit and said resolver and issues commands to said servo-motor whereby the operation of said servo-motor and said driven spindle are controlled.

19. The apparatus of claim 11 wherein said drive means comprises identical sprocket wheels mounted on said servo-motor and said spindle and an endless timing chain wound about and engaging said sprocket wheels whereby said servo-motor drives said spindle at a rate and in a direction identical to that of said servo-motor and whereby said spindle is directly indexable at positions through 360° corresponding to indexing of said servo-motor.

* * * * *